May 25, 1948.　　　　K. A. KAIL　　　　2,442,205
AVIATION TRAINER
Filed July 5, 1943　　　3 Sheets-Sheet 1

KARL A. KAIL
*INVENTOR.*

BY
ATTORNEYS.

May 25, 1948.                K. A. KAIL                    2,442,205
                          AVIATION TRAINER
                       Filed July 5, 1943           3 Sheets-Sheet 2

KARL A. KAIL
    *INVENTOR.*

BY *Donald T. Hillier*
   *Philip S. Hopkins*
                    ATTORNEYS.

May 25, 1948.    K. A. KAIL    2,442,205
AVIATION TRAINER
Filed July 5, 1943    3 Sheets-Sheet 3
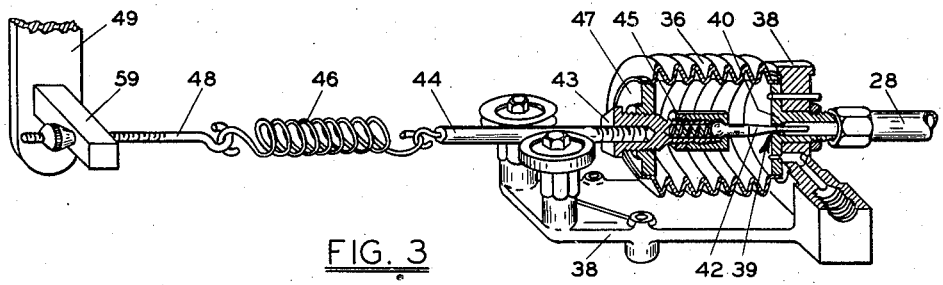
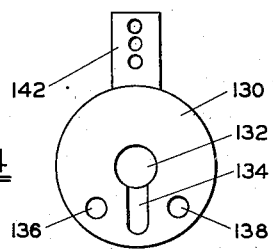
FIG. 4
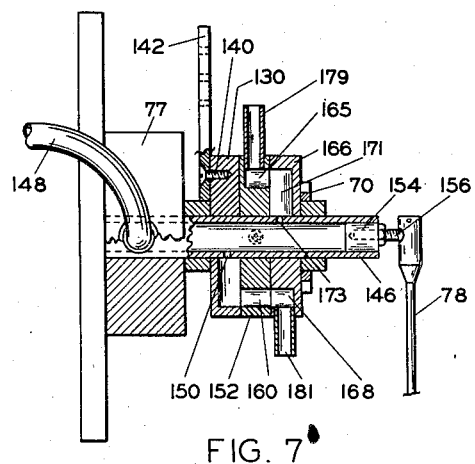
FIG. 7
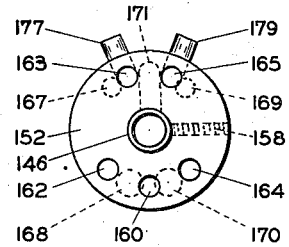
FIG. 5
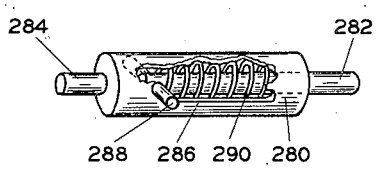
FIG. 2a
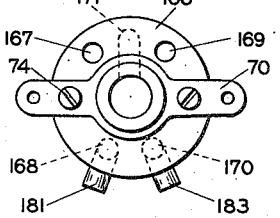
FIG. 6
KARL A. KAIL
*INVENTOR.*
BY Donald T. Hillier
Ralph S. Hopkins
ATTORNEYS.

Patented May 25, 1948

2,442,205

UNITED STATES PATENT OFFICE 2,442,205

AVIATION TRAINER

Karl A. Kail, Montrose, Pa., assignor to Link Aviation, Inc., a corporation of New York Application July 5, 1943, Serial No. 493,558

26 Claims. (Cl. 35—12)

The invention of this application which is a continuation in part of the abandoned application of Franklin A. Fish and myself, Serial Number 448,906, filed June 29, 1942, and of my copending application Serial Number 452,739, filed July 29, 1942, relates to trainers for aviators, and comprises means for simulating in a grounded trainer the response of an airplane and many of the instruments thereof to certain conditions of flight.

My invention has been found to be particularly useful and will be described in connection with an aviation trainer which constitutes essentially a simulated aircraft fuselage mounted upon a universal joint whereby the trainer can be turned, pitched, and banked in all the usual flying positions of a real plane. Such a trainer is disclosed in U. S. P. 1,825,462. United States Patent 2,099,857 discloses means whereby the functioning of certain of the instruments in an airplane, such as the altimeter, vertical speed indicator, and air speed indicator may be simulated in such a trainer.

One of the principal objects of this invention is to provide, in such a trainer, means whereby the functioning of certain of the instruments in a plural motor aircraft may be simulated.

A more specific object of this invention is to provide means whereby the air speed and vertical speed indicators as well as the altimeter in the trainer may be made to respond to a change in the setting of one or both of the throttles in the trainer in a manner similar to the way the corresponding instruments in a plural engine plane respond to a similar change in the settings of one or both of the throttles in a plane.

A still further object of this invention is the provision of means whereby such a trainer may be made to rotate and bank when the throttle settings therein are unequal, thereby simulating the turning and banking of a dual engine plane caused by a difference in the speeds of the engines therein.

A further object of my invention is the provision of means whereby when such a trainer is rotated and banked in response to unequal throttle settings, the nose of the trainer will drop, thereby simulating the corresponding responses of a plane in actual flight.

Another object of this invention is to provide means whereby when such a trainer is made to rotate and bank because of an unequal throttle setting, a "rudder loading" may be placed upon the rudder pedals in the same manner that a "rudder loading" occurs in a plane in actual flight under similar circumstances.

A further object of my invention is to provide in such a trainer a pair of simulated throttles, a differential device operable thereby to be moved in response to relative movement of the throttles and turning and banking means operable by the differential device.

It is another object of my invention to provide in such a trainer a pair of simulated throttles, a differential device operable thereby to be moved in response to relative movements of said throttles, turning and banking means operable by said differential device and independent control means for restoring the banking and turning means to their normal positions independent of the relative positions of said throttles.

It is a further object of my invention to provide means whereby the turning of the trainer in response to the relative throttle positions may be diminished by a banking of the trainer in response to the usual banking means in the trainer.

Other objects and advantages will become apparent as the description proceeds, reference now being made to the accompanying drawings forming a part of this application and wherein like reference numerals indicate like parts. In the drawings, Fig. 1 is a side view of a trainer in which this invention is particularly useful, certain parts being cut away for purposes of illustration.

Fig. 2A is a detailed view of one of the parts of my invention.

Fig. 3 is a detailed perspective view, certain parts being shown in section, of the air speed regulator bellows.

Figs. 4, 5, and 6 are detailed views of the parts of one of the valves of this invention.

Fig. 7 shows the parts shown in the three preceding figures in assembled relation.

General description of trainer

Figure 1:
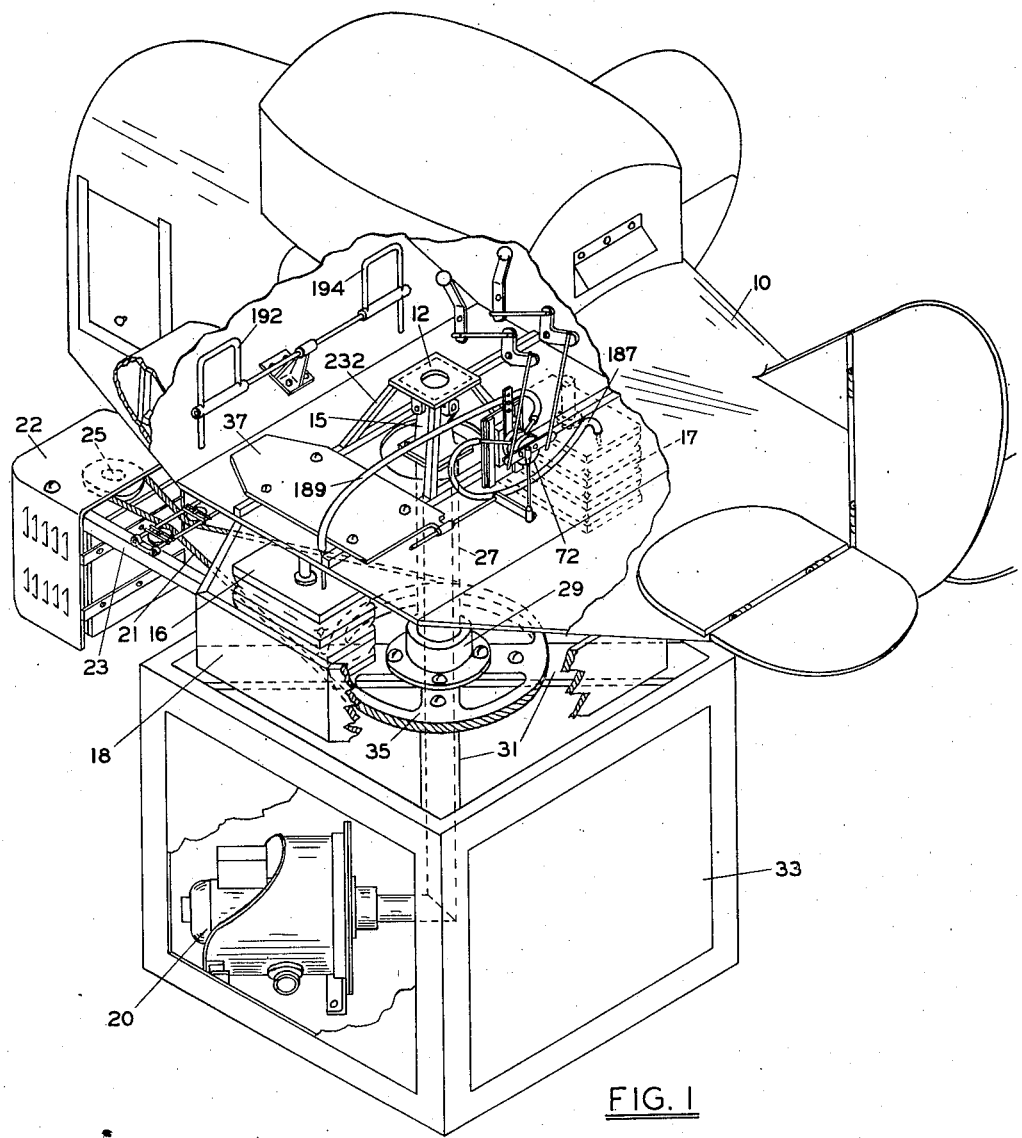

Referring to Fig. 1, it will be seen that such a trainer comprises a fuselage 10 mounted upon a universal joint designated generally as 12, the lower part of this joint being integral with a central supporting member 15. Two pairs of bellows known as the aileron (banking) bellows and the elevator (climb-dive) bellows are provided. The aileron bellows are designated in Fig. 1 by 16 and 17, the former being the left banking bellows and under the left side of the fuselage 10 while the latter is the right banking bellows and is under the right side of fuselage 10 on the side of universal joint 12 opposite bellows 16.

Turbine 20 provides a source of vacuum and by means of suitable connections supplies vacuum to the central port of a valve known as the aileron valve. This valve when in its normal position applies an equal amount of vacuum to bellows 16 and 17 and, therefore, the trainer is laterally level, but if the control column be moved as the control column in a real plane is moved to back the plane to the left, the aileron valve is moved in such a manner as to admit vacuum to left bellows 16 and atmosphere to right bellows 17, causing bellows 16 to collapse and bellows 17 to expand and the trainer banks to the left. A movement of the control column in the trainer in the opposite direction beyond its central position through similar functioning causes the trainer to bank to the right.

Another pair of bellows (not shown) known as the elevator bellows are provided, one of these bellows being under the front of the fuselage 10 and the other under the rear. Upon the pushing forward of the control column the elevator valve is moved, admitting vacuum to the front elevator bellows and atmosphere to the rear elevator bellows, and the trainer assumes a driving attitude. A pulling to the rear of the control column reverses the application of vacuum and atmosphere and the trainer assumes a climbing attitude.

There is also connected to the trainer fuselage by means of extending arm 23 a turning motor 22, the output shaft of which has a pulley 25 fixedly mounted thereupon. The main support 15 of the fuselage 10 has its lower end 27 rotatably mounted in a receiving member 29 which is affixed to cross member 31 of stationary base 33. A fixed pulley wheel 35 is also rigidly mounted upon the cross piece 31. An endless belt 21 is placed around this fixed pulley wheel as well as around the wheel 25 on the end of the shaft of said turning motor 22. The turning motor 22 is also connected to the source of vacuum 20, there being in the connecting means a rudder valve which is operated by the rudder pedals 192 and 194 in the trainer. When the student in the trainer applies either foot to one of the rudder pedals, the rudder valve link (to be later described) is moved and the rudder valve is positioned so that reduced air pressure is admitted to the appropriate side of the turning motor (which is in reality a double acting air motor) and the output shaft of the turning motor is rotated in the correct direction, thereby rotating the pulley 25 fixed thereto. The endless belt 21 wraps around the fixed pulley 35 which is affixed to stationary base 33 and the turning motor is mounted upon arm 23 which is affixed to octagon 18 which in turn is affixed to rotatable central supports 15 and 27. When output wheel 25 is rotated in response to rudder pedal movements the friction between the large fixed pulley 35 and belt 21 prevents any slippage and so wheel 25 travels along belt 21, causing motor 22, octagon 18, bellows 16 and 17 and fuselage 10 to turn above stationary base 33.

From the foregoing it will be realized that the trainer fuselage of the described trainer may be made to dive, climb, bank and rotate in simulation of the diving, climbing, banking and turning of a real plane in flight. All of the foregoing means form no part of the present invention, except in combination with means to be later described, and for a detailed description thereof reference is made to U. S. P. 1,825,462 and 2,099,857.

It will be realized that in an airplane there is provided an altimeter which indicates the height of the plane above some point on the earth's surface as well as a vertical speed indicator which shows at any given instant whether the plane is gaining or losing altitude, or whether it is in a level flight position. In the event that the plane is not in the level flight position, the rate of change of the altitude of the plane is shown by the vertical speed indicator. These two instruments in a real plane are responsive to the pressure of the atmosphere which surrounds them, the altimeter being responsive to the absolute pressure and therefore indicating the height of the plane above some point on the earth's surface, and the vertical speed indicator, being responsive to the rate of change of the pressure of the atmosphere surrounding it, shows the rate of change of the altitude of the plane.

The altimeter in a plane has an indicating hand which moves across the dial a distance proportional to the change in atmospheric pressure, and hence, proportional to the change in the altitude of the ship. The vertical speed indicator has a hand which remains in the horizontal position when the atmospheric pressure is constant, thus indicating that the plane is in level flight, this hand moving upward when the atmospheric pressure is decreasing, and moving downward when the atmospheric pressure is increasing, thus indicating that the plane is gaining or losing altitude, respectively.

As before implied, the trainer of the "grounded" type before mentioned, although it be in a climbing or diving attitude does not actually gain or lose altitude. Nevertheless, it has been found advantageous to install in such a trainer an altimeter and a vertical speed indicator to indicate the assumed trainer altitude and assumed rate of change of trainer altitude. In order that these instruments in the trainer will properly show the assumed trainer altitude and assumed rate of change of such altitude, an equalizer tank has been installed in the trainer. The altimeter and vertical speed indicator are connected to this tank and by causing the pressure within this tank to change according to the assumed trainer altitude in the same manner that the atmospheric pressure around a plane in flight changes as the altitude of the plane changes, the altimeter and vertical speed indicator in the trainer will show the assumed trainer altitude and rate of change thereof. This tank, within operating limits, never has more than the prevailing atmospheric pressure therein, and whenever the trainer is "flying" at an altitude above ground level, the pressure within the tank is less than atmospheric.

Inasmuch as the altitude of a plane at a given moment depends upon the successive attitudes and throttle positions thereof as well as the length of time that the plane has maintained its successive attitudes and throttle settings since the takeoff, the pressure within the equalizer tank in the trainer at a given moment is also made to depend upon these same factors in the trainer. If the trainer assumes a climbing attitude, the throttle setting remaining constant, the pressure within the tank decreases, the total decrease depending upon the angle of climb and the length of time the trainer remains in its climbing position. The total decrease in pressure within the tank affects the altimeter which gives the altitude of the plane. The rate of decrease at any given moment, throttle setting not considered, will depend upon the attitude of the trainer, and the vertical speed indicator will respond to this factor. Of course, if the trainer assumes a diving attitude the pressure within the tank is built up according to the same rules and the instruments respond accordingly.

Also, if the throttle in the trainer is opened, the trainer attitude remaining constant, the pressure within the equalizer tank is decreased, the total decrease depending upon the amount of the opening of the throttle as well as the length of time that the throttle remains open. The rate of change depends upon the amount that the throttle is opened. The altimeter and vertical speed indicator will respond appropriately.

All the above instrument functioning also forms no part of the present invention except as combined with the novel features of the instant invention, and, therefore, a more detailed description is omitted, but for a full disclosure reference is made to the above-mentioned U. S. P. 2,099,857. However, in the light of the foregoing discussion, the objects of the instant invention and the following means of attaining them will be more readily understood.

Figure 2:
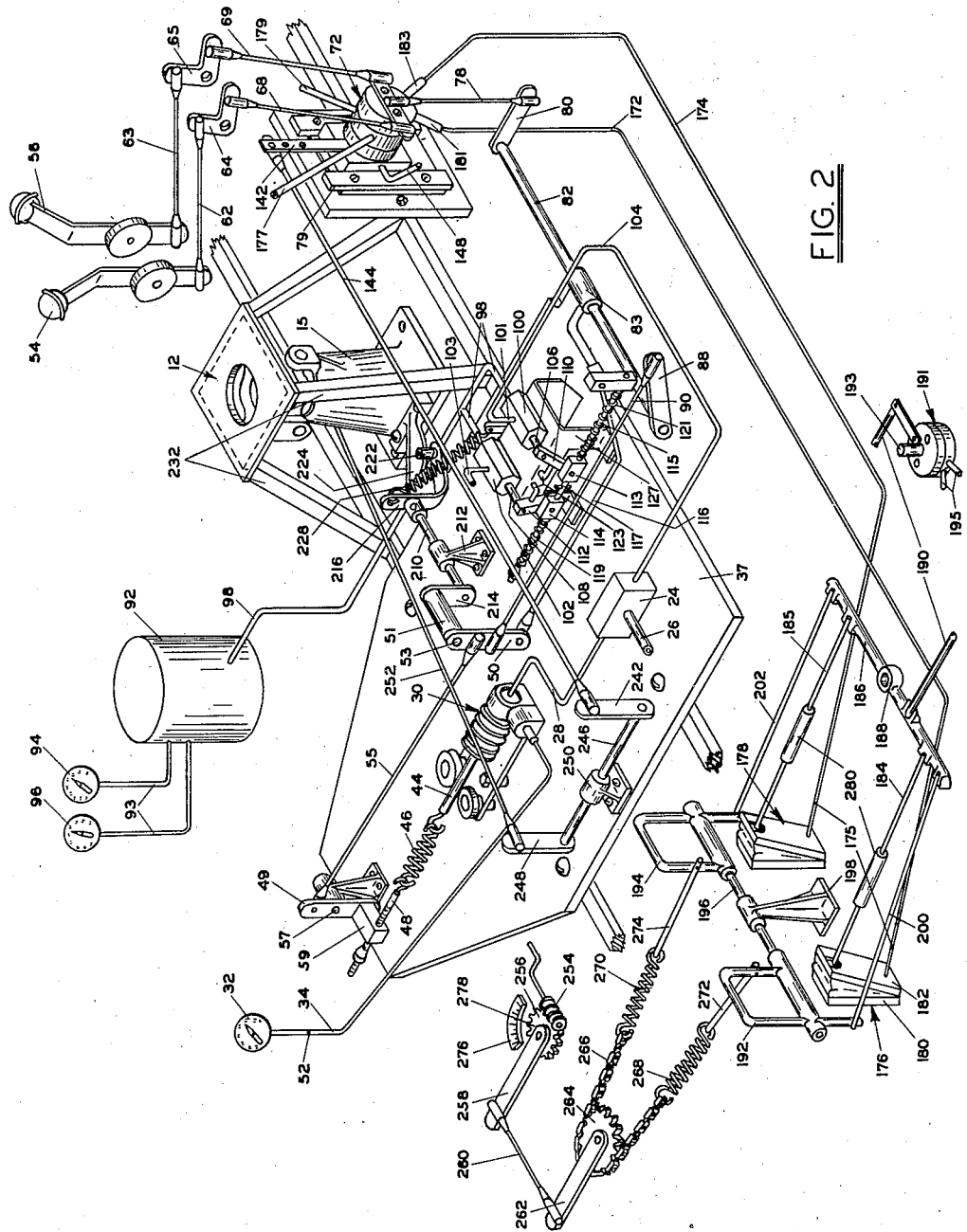
Fig. 2 is a diagrammatic illustration of the principal parts of this invention.

The apparatus which is shown in Fig. 2 includes most of the detailed parts of this invention, said apparatus for the most part being inside trainer fuselage 10 and resting on platform 37, as seen in Fig. 1. A manifold 24 is connected to a vacuum pump (not shown) referred to in the art as the altitude pump, by means of tube 26 and, therefore, manifold 24 always contains reduced air pressure. By means of connection 28 the manifold 24 is connected to air speed regulator bellows designated generally by 20. Air speed regulator bellows is in turn connected to air speed instrument 32 by means of hose connection 34.

In Fig. 3, the numeral 36 refers to air proof bellows preferably made of light metal construction. This bellows may be mounted in any suitable manner upon a frame member 38 which in turn is mounted on the platform 37 of the trainer fuselage 10. Within bellows 36 is a needle valve designated generally by 39 and comprising a seat 40 and a needle 42. Seat 40 is rigidly affixed to frame member 38 while needle 42 is attached to extension 45 of plug 43 which is screwed in the end 47 of the bellows. Link 44 is also screwed into plug 43 as shown. It will be seen that link 44, spring 46, link 48, and extension 59 complete the connection from needle 42 to lever 49.

When the lower part of lever 49 is moved to the left in Figs. 2 and 3, link 48, spring 46, and link 44 will move likewise and the left end 47 of bellows 36 will be pulled to the left. Bellows 36 will therefore be expanded and at the same time needle 42 will be pulled from its seat 40 and reduced air pressure from the manifold 24 will be applied through connection 28 to the bellows 36 and by means of connection 34 to air speed instrument 32. The detailed construction of air speed instrument 32 forms no part of the instant invention; rather it may be of any suitable well-known type providing it has an indicator hand whose position varies appropriately as does the pressure within the bellows 36. As the pressure within bellows 36 becomes gradually reduced through the action of vacuum source 24, bellows 36 gradually collapses thereby drawing link 44 and the members connected thereto with it to the right in Fig. 3. This gradual closing movement continues until the atmospheric pressure within bellows 36 and the tension of spring 46, both of which forces tend to expand bellows 36, exactly equal the atmospheric pressure on the outside of bellows 36, which latter force tends to collapse said bellows and thereby close needle valve 39. When these opposing forces are balanced, vacuum source 24 will exhaust from the bellows the same amount of air that enters through bleed hole 52 in line 34.

Because of the above equation of forces, by varying the tension upon spring 46, the amount of vacuum necessary within bellows 36 to balance the atmospheric pressure on the outside of said bellows may be varied. The varying vacuum within air speed regulator bellows 36 will in turn vary the reading of air speed instrument 32. Hence, by moving the lower end of arm 49 to the right or left in Fig. 3, the tension upon spring 46 will be decreased or increased respectively, and the vacuum within bellows 36 will correspondingly be decreased or increased. The greater the vacuum the higher the reading of air speed instrument 32 which indicates the simulated air speed of the trainer.

*Functioning of instruments in a simulated dual engine trainer*

Two throttle controls 54 and 56, assumed to be associated with the left and right "engines" of the trainer, respectively, are provided. These throttles are mounted upon any suitable part appropriately located in the interior of the trainer. It will be noticed that the lower end of throttle 54 has pivotally connected thereto a link 62 which in turn is pivotally connected to the upper end of a bell crank 64 which is pivotally mounted upon any suitable part of the interior of the trainer fuselage 10. Pivotally connected to the other end of bell crank 64 is one end of a rod 68, the other end of which is pivotally connected to a cross piece 70. Cross piece 70 is rigidly affixed by means of screws 74 to the outer leaf of a 3-leaf valve designated generally in Fig. 2 as 72. This 3-leaf valve, which will later be described in detail, is mounted upon a hollow shaft which extends through all the leaves and which is rigidly affixed to a sliding member 77 which is free to slide up and down in a track designated generally by 79. Pivotally mounted upon the central portion of cross piece 70 is the upper end of link 78, the lower end of which is pivotally attached to one end of arm 80. The other end of arm 80 is rigidly affixed to shaft 82, which runs transverse of and which is pivotally mounted in extension 83 of platform 37 in the bottom of the trainer fuselage. On the other end of shaft 82 is rigidly affixed arm 88, to the upper end of which is pivotally connected link 90. The other end of link 90 is pivotally mounted to the central portion of walking beam 50. This walking beam is pivotally attached to horiozntal stub shaft 51 at the point 53. Also pivotally attached to lever 50 is link 55 the other end of which is likewise connected to arm 49 at a point above the pivot 57 of arm 49. Pivotally attached to arm 49 at the other end is extension 59 and link 48, to which reference has been previously made.

It will be recalled that any movement of the lower end of arm 49 to the right or left in Fig. 2, through the action of link 48, spring 46 and the needle valve 39 shown in detail in Fig. 3 will result in a change in the reading of air speed instrument 32. By referring to Fig. 2, it will be noticed that the movement of throttle 54 in either direction will move link 62, bell crank 64, and link 68 will be made to move up or down depending upon whether the throttle 54 is moved rearward or forward, respectively. This movement of link 68 will be transferred to cross piece 70 and therefore, the 3-leaf valve 72, the left end of cross piece 70, and slide 77 will be made to move in the same direction as the movement of link 68, slide 77 moving in track 79. The right end of cross piece 70 will pivot on the point where it is attached to link 69. This will impart a like movement to link 78, and the right end of arm 80 will be made to move up or down. This will cause shaft 82 to turn one way or the other, thereby moving the upper end of arm 88 which will in turn cause link 90 to reciprocate. This movement of link 90 will cause arm 50 to move back and forth, in this instance being pivoted about the point 53. Link 55 will therefore cause arm 49 to pivot about the point 51, thereby causing link 48 to reciprocate. Therefore, a change in the position of the throttle 54, by affecting the position of the lower end of arm 49, also affects the position of link 48 and hence the tension upon spring 46, which spring, as outlined above, governs the amount of vacuum within bellows 36. This amount of vacuum determines the reading of air speed indicator 32.

The indicator attached to air speed instrument 32 is constructed so that the greater the vacuum within bellows 36 the greater is the indicated air speed. By a consideration of the linkages just discussed, it will be seen that a pushing to the left of throttle 54, which action simulates an increase or opening of the throttle of the assumed left engine, the lower end of arm 49 is made to move to the left in Fig. 2 and, therefore, the tension upon spring 46 becomes greater. The vacuum within bellows 36 will therefore become greater, and so will the indicated air speed of the trainer.

As throttle 54 is moved to the right in Fig. 2, simulating a decrease in the throttle setting of the assumed left engine, it will be realized that the lower end of arm 49 will move to the right in Fig. 2 and the tension upon spring 46 will become less and the vacuum within bellows 36 will also be lessened. This increase in pressure will cause a corresponding decrease in the indicated air speed of the trainer.

A change in the setting of throttle 54 does not cause an instantaneous total change in the indicated air speed, but instead, the changed throttle setting causes a gradual change in the vacuum within bellows 36, and therefore, a gradual change in the indicated air speed. This simulates the gradual response of the air speed indicator of a plane in flight to a changed throttle setting.

It can be seen in Fig. 2 that a change in the setting of throttle 56 will produce a change in the indicated air speed in the same manner as a change in the setting of throttle 54 because throttle 56, acting through link 63, bell crank 65, and link 69, affects cross piece 70, valve 72 and link 78 in the same manner that a similar movement of throttle 54 affects these parts. Therefore, a detailed description of the effect of the throttle setting of the assumed right engine of the trainer is deemed unnecessary.

A movement of throttle 54 in one direction and an equal but opposite movement of throttle 56 will produce no change in the indicated air speed because the opposite movements applied to horizontal bar 70, which acts as a differential, will cancel one another and valve 72, slide 77 and link 78 will neither be moved up nor down; but a like movement of both throttles in the same direction will result in a change in the indicated air speed greater than a movement of one of the throttles because of the greater movement of horizontal member 70 and link 78. This simulates the results of corresponding settings of the throttles in a dual engine aircraft.

It may be concluded, therefore, that my invention provides means whereby the simulated air speed of a dual engine trainer may be made to vary with a change in the throttle setting of either or both of the assumed engines in the same manner that the real air speed of a dual engine plane in flight varies with corresponding changes in throttle settings.

Furthermore, this invention provides means whereby the simulated air speed of a dual engine trainer may also be made to vary with a change in the attitude of the trainer. As seen in Fig. 2, horizontal shaft 210 is mounted for rotation in brackets 212 (only one of which is shown) which are fixedly attached to the platform 37 on the trainer fuselage 10. The left end of shaft 210 is rigidly affixed to arm 214 and to the upper end of this arm is rigidly affixed stub shaft 51, to which reference has been previously made. The arrangement of arm 50, link 55, and the lever 49 has been previously explained.

To the right end of shaft 210 is fixedly connected pitch action arm 216 which has a roller 222 suitably mounted upon the lower end thereof. Attached to the upper end of arm 216 is spring 228, the other end of which is attached to a part affixed to platform 37. Because of this arrangement, it will be understood that spring 228 at all times maintains roller 222 in contact with cam 224.

As seen in Figs. 1 and 2, platform 37, brackets 212 and all of the other parts mounted upon platform 37, as seen in Fig. 2, are suspended below universal joint 12 by means of members 232. Whenever the trainer fuselage 10 pitches in simulation of the climbing of a plane in actual flight, the platform 37 also assumes a climbing attitude and it swings ahead of its level flight position, carrying with it brackets 212 and all of the other members affixed thereto. Roller 222 cannot move forward because pitch action cam 224 engages it. Brackets 212 (only one of which is shown) therefore move with respect to pitch action lever 216 as though roller 222 and the lower end of lever 216 were pushed toward the rear of fuselage 10, i. e., to the right in Fig. 2. The upper end of arm 214 and stub shaft 51 therefore move toward the head of the trainer fuselage as does the upper end of arm 50 which in this instance pivots about the point where link 90 attaches thereto. Link 55 and the upper end of lever 49 move ahead and the bottom of lever 49 moves to the rear, decreasing the tension upon spring 46. This resulting decrease in tension allows the atmospheric pressure upon the outside of bellows 36 to collapse the bellows and the opening of the needle valve therewithin is reduced, the extent of this reduction depending upon the amount of change in the attitude of the trainer. Vacuum from manifold 24 will therefore not have as large an orifice to work through and more atmosphere will enter bleed hole 52 than is exhausted from the bellows by manifold 24. A gradual increase in the pressure within bellows 36 will result and a gradual decrease in the air speed as indicated by air speed indicator 32 will occur. The pressure within bellows 36 will increase until the vacuum within bellows 36 equals the tension upon spring 46. When this point is reached, the vacuum source will exhaust from the bellows the same amount of air as enters the system by means of bleed hole 52.

On the other hand, if the trainer fuselage 10 is pitched in simulation of the diving of a plane in actual flight, platform 37 also assumes a diving attitude and it swings behind its level flight position, carrying with it brackets 212 and all of the parts mounted thereupon. Tension spring 228 pulling upon the top of pitch action lever 216 maintains roller 222 in contact with pitch action cam 224. Brackets 212 therefore move with respect to pitch action lever 216 as though roller 222 and the lower end of the lever were pushed toward the head of the fuselage 10, i. e., to the left in Fig. 2. The upper end of arm 214 and stub shaft 51 therefore move toward the rear of the trainer fuselage as does the upper end of arm 50, also pivoting in this instance about the point at which link 90 is attached thereto. Link 55 and the upper end of lever 49 move toward the rear, the bottom of lever 49 moves toward the head of the fuselage, increasing the tension upon spring 46. The size of the opening of the needle valve within air speed regulator bellows 30 is therefore increased and the vacuum from manifold 24 decreases the pressure within this bellows. In response to this decreased pressure, air speed indicator 32 will indicate an increased assumed air speed.

It should be noted therefore that a climbing attitude of the trainer fuselage decreases the tension upon spring 46 and a lower indicated air speed results while a diving attitude of fuselage 10 increases the tension upon spring 46 and a higher air speed is indicated.

From the foregoing it will be realized that my invention provides means whereby the indicated air speed of the trainer may be changed by an opening or closing of either or both of the throttles and by a change in the attitude of the fuselage in simulation of the changing of the indicated air speed of a plane in actual flight in response to corresponding movements.

In an airplane in flight, whether it carry one or more engines, a changed throttle setting will cause the plane to change its altitude—an increased setting causing the plane to climb while a decreased setting will cause the plane to lose altitude. No change in the attitude of the plane necessarily results from a change in the throttle setting—the change in altitude may be caused by a difference in the "lift" resulting from the change in air speed of the plane. Inasmuch as there is a change in altitude resulting from a change in throttle setting, the altimeter as well as the vertical speed indicator in a plane will reflect this change. The following means have been incorporated in this invention to produce the correct response of the altimeter and the vertical speed indicator to a change in throttle setting in a dual engine trainer.

Referring to Fig. 2, an equalizer tank 92 has connected to it by hose connections 93 an altimeter 94 and a vertical speed indicator 96. Altimeter 94 shows the simulated altitude of the trainer, its reading varying with the atmospheric pressure within tank 92, the lower the pressure the greater the indicated altitude. Vertical speed indicator 96 simulates in appearance the real instrument of the same name used in actual flight, when the atmospheric pressure within tank 92 is decreasing the vertical speed indicator moving in a clockwise direction from the level flight position, thus indicating that the trainer is gaining altitude, and moving in this direction a distance corresponding to the rate of change of altitude. On the other hand, when the atmospheric pressure within tank 92 is increasing, the opposite result occurs, thus showing the fact of descent and rate thereof. It is therefore evident that by changing the atmospheric pressure within tank 92, the altimeter 94 will show the simulated altitude of the trainer and the vertical speed indicator 96 may be made to show the fact of ascent or descent and the rate thereof.

Equalizer tank 92 is connected by means of hose 98 to one of the ports of climb valve 100 and to one of the ports of dive valve 102. The port 101 of climb valve 100 is also connected by means of hose 104 to manifold 24, while the second port 103 in dive valve 102 runs directly to the atmosphere. The detailed construction of the climb and dive valves forms no part of this invention and for a detailed description thereof reference is made to the above-mentioned U. S. Patent 2,099,857. In order to understand the instant invention it is sufficient to know that each of the valves 100 and 102 is a needle valve, in the case of the climb valve 100, the needle and seat being between the port leading to the equalizer tank 92 and the port 101 leading to the manifold 24; and in the case of the dive valve, the needle and seat are between the port leading to the equalizer tank 92 and the port 103 which opens into the atmosphere. Connected to the needles in each of the valves is a threaded stem, the outer ends of which are designated by the numbers 106 and 108. The threaded stem 106 works in the interior of climb valve 100 which is threaded for the reception thereof, while stem 108 is likewise a part of dive valve 102.

Fixedly connected to the end of threaded stem 106 is an operating arm 110 and a similar member 112 is likewise connected to threaded stem 108. Each of the operating arms 110 and 112 is pivotally connected to one of the pair of blocks 113 and 114 which are slidably mounted upon reciprocating member 115. A pair of stops 123 are fixed to the front of mounting 127 upon which the climb valve 100 and dive valve 102 are mounted. When arm 110 is in the position contacting its stop 123, climb valve 100 is closed and when arm 112 is in contact with its stop 123, the dive valve 102 is closed. Movement of arm 110 to the right in Fig. 2 opens the climb valve 100 which is right-hand threaded, while a movement to the left of arm 112 opens the dive valve 102 which is left-hand threaded.

Fixedly attached to the central portion of member 115 between blocks 113 and 114 is a stop 117, so when member 115 moves to the left in Fig. 2, stop 117 likewise moves in that direction carrying before it block 114 which in turn carries arm 112 to the left, thereby opening dive valve 102 and permitting communication between port 103 leading to the atmosphere and equalizer tank 92. At the same time, spring 119 will remain in its normal state, but spring 121 will be contracted because block 113 and arm 110 remain stationary because of the presence of stop 123. Therefore, such a movement will not affect the position of climb valve 100. However, a moving of member 115 to the right in Fig. 2 will open climb valve 100, thus admitting reduced air pressure to the equalizer tank 92, but this movement will not affect arm 112 of dive valve 102, and therefore, dive valve 102 will remain closed.

Referring to Fig. 2, it will be recalled that the lower end of arm 50 moves to the right when either of the throttles 54 or 56 is opened, said arm pivoting about the point 53. It will be seen, therefore, that an opening of either of the throttles 54 or 56 will cause link 116 which is pivotally connected to the lower end of arm 50 and member 115 which is connected to link 116 and stop 117 to move to the right, thereby moving the lower end of operating arm 110 to the right, opening climb valve 100 and admitting reduced air pressure from manifold 24 into equalizer tank 92. The atmospheric pressure within equalizer tank 92 will therefore become reduced and the altimeter 94 will indicate a higher altitude and the vertical speed indicator will indicate the fact of ascent and rate thereof. The longer climb valve 100 remains open, of course, the greater will become the vacuum within tank 92, and therefore, the greater will be the indicated altitude.

On the other hand, a decrease in the setting of either throttle 54 or 56 will cause the lower end of arm 50 to move to the left in Fig. 2 and links 116 and 115 will likewise be moved to the left. The needle valve in climb valve 100 will remain closed, but the valve in dive valve 102 will open, allowing communication between the atmospheric port 103 and the equalizer tank 92. A greater atmospheric pressure will be introduced into equalizer tank 92 and consequently, altimeter 94 will show a decreased altitude and vertical speed indicator 96 will show the fact of descent and rate thereof.

The amount that either climb valve 100 or dive valve 102 is opened depends upon the extent to which and the direction in which throttles 54 and 56 are moved. As in the case of their effect upon the indicated air speed, a movement of one throttle in one direction and an equal but opposite movement of the other throttle will have no effect upon either of the valves 100 or 102, because of the cancelling effect of the opposite movements of bar 70, but a given movement of both throttles in the same direction will have a greater effect than a like movement of but one throttle. The net change in the positions of the center of differential bar 70 and link 78 from their level flight positions controls the rate of climb or descent as shown by vertical speed indicator 96, while the length of time that such a change remains in effect controls the amount of total change in altitude indicated by altimeter 94.

It will be recalled that if either throttle is opened, air speed indicator 32 shows an increased indicated air speed. This same movement opens climb valve 100 and therefore vertical speed indicator 96 and altimeter 94 show the fact of ascent and total change in altitude. On the other hand, a closing of either throttle causes air speed indicator 32 to show a falling off, altimeter 94 shows a loss of altitude and vertical speed indicator 96 shows the rate of descent. It will therefore be realized that air speed indicator 32, altimeter 94 and vertical speed indicator 96 work together as do their counterparts in a real plane.

This invention therefore provides, by the foregoing described arrangement, means whereby the vertical speed indicator and the altimeter in a dual engine trainer respond to a change in the throttle setting of either or both of the assumed engines just as the same instruments in a real plane respond to a corresponding change in the throttle settings of a plane in flight, and also that the functioning of these instruments is properly correlated with the functioning of the airspeed indicator.

Furthermore, this invention provides means whereby the vertical speed indicator and the altimeter in a dual engine trainer may be made to respond not only to a change in the setting of either or both of the throttles but to a change in the attitude of the trainer fuselage as well, as will now be explained.

It will be recalled that whenever the trainer fuselage 10 pitches in simulation of climbing, stub shaft 51 will be moved toward the front of the trainer and arm 50 will pivot about the point where it is connected to link 90. The lower end of arm 50 and link 116 will move to the right in Fig. 2, thereby opening climb valve 100. As before explained, this will cause altimeter 94 and vertical speed indicator 96 to register the amount of ascent and the rate thereof.

On the other hand, if the trainer fuselage 10 be pitched in simulation of a dive, shaft 210 will be moved to the rear of its level flight position and stub shaft 51 will move toward the rear of the trainer or to the right in Fig. 2. Link 116 will therefore be moved toward the front of the trainer or to the left in Fig. 2 and dive valve 102 will be opened. Altimeter 94 and vertical speed indicator 96 will therefore reflect the change in altitude and rate thereof.

Therefore, this invention provides means whereby the vertical speed indicator and the altimeter in a dual motor trainer not only respond to the changes in the throttle settings therein but respond as well to a change in the attitude of the trainer.

*Turning and banking of trainer in response to differences in simulated motor speeds*

In a dual engine plane which is flying in the level flight position, if one of the engines is making a greater number of revolutions per minute than the other the plane will turn toward the side of the slower engine. Furthermore, because any plane will automatically bank when it is turning, and as a result of other factors, the turning produced by the different engine speeds is accompanied by a banking of the plane. The difference in engine speeds which brings about these results is usually produced by unequal throttle settings. The following means have been incorporated in this invention so that when there is an unequal setting of the throttles the trainer will turn and bank in the same manner that a plane in flight under the same circumstances would turn and bank.

Referring to Fig. 2, it will be recalled that whenever throttle 54 is moved to the left or right in Fig. 2, the end of horizontal bar 70 to which link 68 is pivotally connected will move down or up respectively and a similar movement results at the end of bar 70 to which link 69 is connected whenever throttle 56 is moved to the left or right in Fig. 2. Reference is now made to Figs. 4, 5, 6, and 7 which show in detail the construction of the 3-leaf valve which is designated generally in Fig. 2 by the number 72. Fig. 4 shows in detail the construction of the leaf 130 which is the leaf toward the front of the trainer as seen in Figs. 1 and 2. It will be seen that this leaf has a central port 132 extending completely therethrough, and a counterbore 134 extending a substantial distance into the rear face (face toward rear of trainer) of this valve connects with central port 132. Ports 136 and 138 extend completely through leaf 130 so that they are at all times in communication with the atmosphere.

Rigidly affixed to the front face (face toward head of trainer) of leaf 130 by means of screws 140, as shown in Fig. 7, is an upstanding arm 142. As shown in Fig. 2, to the upper end of arm 142 is pivotally connected link 144. Leaf 130 is rotatably mounted upon hollow shaft 146 which is connected to a vacuum supply line 148 which also connects to turbine 20. It will be realized, therefore, that vacuum enters hollow shaft 146 and through port 150 in hollow shaft 146 manifests itself at all times in counterbore 134 which is in contact with the front face of leaf 152, as seen in Fig. 7. Atmosphere at all times enters ports 136 and 138 and likewise is in contact with the front face of leaf 152. A plug 154 is in the end of hollow shaft 146 so that air may not enter that end. Within plug 154 is a threaded member 156 to the outer end of which is pivotally attached the upper end of link 78.

Fig. 5 shows in detail the construction of middle leaf 152. This leaf is also mounted upon hollow shaft 146 but cannot rotate thereupon because of the presence of set screw 158. It will be seen that this leaf has a port 160 which extends completely therethrough and which is in perfect engagement with the counterbore 134 of leaf 130 when leaf 130 is in its central position. Fig. 7 shows leaf 130 in its fixed position. Two other ports 162 and 164 likewise extend completely through leaf 152 and are also in engagement with the ports 136 and 138 when leaf 130 is in its normal position. Ports 163 and 165 which are in the rear face of leaf 152 and therefore adjacent the front face of leaf 166 extend a substantial distance within leaf 152 and then turn at right angles to communicate with hollow fittings 177 and 179 mounted in the ports. Connection 187 extends from fitting 177 to the right aileron bellows 17 while connection 189 places the left aileron bellows 16 in communication with fitting 179. When leaf 130 is in the central position, therefore, reduced air pressure will be present in port 160 and atmospheric pressure will be present in ports 162 and 164. All three of these ports are in engagement with the adjacent front face of leaf 166, as seen in Fig. 7.

The construction of leaf 166 is shown in detail in Fig. 6. It will be seen that rigidly affixed to the outer face of this leaf by means of screws 74 is cross bar 70 which has been mentioned several times previously. Two ports 168 and 170 extend from the front face of leaf 166 adjacent center leaf 152, as seen in Fig. 7, a substantial distance within that leaf and then turn at right angles to communicate with the circular periphery of this leaf and hollow fittings 181 and 183 mounted therein. In the upper part of leaf 166 are two ports 167 and 169 extending completely through this leaf and a counterbore 171 which extends a substantial distance within the front face of leaf 166 adjacent the rear face of leaf 152 and connects with the vacuum supply inside hollow shaft 146 by means of port 173.

Whenever bar 70 is in the horizontal position, port 168 in the front face of leaf 166 slightly overlaps vacuum port 160 of leaf 152, and port 168 lies adjacent port 162, as shown in Fig. 5. At the same time, port 170 slightly overlaps vacuum port 160 and lies adjacent port 164. Therefore, whenever bar 70 is in the horizontal position as shown in Fig. 2, a slight amount of reduced air pressure will be admitted to the ports 168 and 170 and, therefore, to connections 172 and 174 which are connected to bellows 176 and 178, respectively. Also, whenever bar 70 is in the horizontal position counterbore 171 in the front face of leaf 166 is completely covered by that portion of leaf 152 between ports 163 and 165 and therefore no vacuum is supplied to connections 187 and 189 which connect ports 163 and 165 with the right aileron bellows 17 and left aileron bellows 16, respectively. Port 167 is then to the left of port 163 and port 169 is to the right of port 165. Therefore, whenever bar 70 is in the horizontal position the vacuum always present in counterbore 171 will not be applied to ports 163 and 165 and, therefore, will not be applied to the connections 187 and 189 which go from the outlets 177 and 179 to the aileron bellows 17 and 16, respectively. Atmosphere will not be applied through either of the ports 167 or 169 to ports 163 or 165.

Bar 70 is in the horizontal position only in case both throttles 54 and 56 have a like setting and, therefore, whenever these two throttles are thus set, rudder pressure bellows 176 and 178 will remain in their normal positions as will the aileron and banking bellows 17 and 18.

However, in the event that the setting of throttle 54 differs from the setting of throttle 56, bar 70 will no longer be maintained in its horizontal position and in moving therefrom it will rotate leaf 166 and port 168 will communicate with port 162 of leaf 152 or to a greater extent with port 160 of the same leaf, depending upon the direction of movement. At the same time, port 170 will communicate to a greater extent with port 160 or with port 164. This communication will cause a more than normal amount of vacuum to be applied through port 160 of leaf 152 to one of the ports 168 or 170 while atmosphere will be applied through port 162 or 164 of leaf 152 to the other port, causing excess vacuum to be applied to one of the connections 172 or 174 and atmosphere to be applied to the other. Therefore, one of the bellows 176 or 178 will be affected by the atmospheric pressure which will enter and the other will be affected by the applied vacuum. One of the bellows will therefore contract while the other will expand.

Referring to Fig. 2, the side 180 of bellows 176 toward the front of the trainer is rigidly affixed to any suitable stationary part of the trainer. The rear side 182 of this bellows is the movable side and has connected to its top by suitable pivotal means a link 184 which has its other end likewise attached to the left end of rudder bar 186. It will be appreciated that as bellows 176 expands and contracts, side 182 will move back and forth and rudder bar 186 through the action of link 184 will be made to pivot about point 188. This movement will affect the position of link 190 which connects with the upper rotatable section of the rudder valve designated generally by 191.

Bellows 178 is similar in all respects to bellows 176 and is connected to rudder bar 186 by means of link 185. It should be noted, however, that a contraction of bellows 176 has the same effect upon rudder bar 186 and link 190 as an expansion of bellows 178.

The central port of rudder valve 191 is supplied with vacuum by means of connection 193 which goes to turbine 20 and each of the outlets 195 connects to one side of turning motor 22. A movement of rudder valve link 190 to the rear rotates the upper section of rudder valve 191 so that atmosphere is applied to one of the outlets 195 and vacuum to the other, and these outlets are connected to the turning motor 22 so that the trainer turns to the left. A movement of rudder valve link toward the head of the trainer reverses the application of vacuum and air to the outlets 195 and the trainer, through the reverse action of turning motor 22, rotates to the right. The construction of this rudder valve forms no part of the instant invention, and for a detailed description thereof reference is made to the aforementioned U. S. Patent 2,099,857.

Rudder pedals 192 and 194 are rotatably mounted upon shaft 196 which is rigidly held by brackets 198, only one of which is shown. If rudder pedal 192 is pushed forward, link 200 which is attached to this rudder pedal at a point below shaft 196 will move to the rear, the left end of rudder bar 186 will move in the same direction, and link 190 will move to the rear, thereby turning the upper section of the rudder valve, vacuum is applied to one of the outlets 195 and atmosphere to the other, and thence to the turning motor 22, causing the trainer to turn to the left; but if rudder pedal 194 be pushed forward, link 190 will move in the opposite direction, vacuum and atmosphere in outlets 195 will be reversed and the trainer will turn to the right. It is to be noted that an expansion of bellows 176 and a contraction of bellows 178 affects rudder valve link 190 and rudder valve 191 in the same manner as though pressure were applied to rudder pedal 192. On the other hand, a contraction of bellows 176 and an expansion of bellows 178 gives the same result as applying pressure to rudder pedal 194.

Returning to valve 72, if throttle 54 be farther opened than throttle 56, the end of bar 70 to which link 68 is connected will be lower than the other end of this bar. Valve section 166 will therefore be rotated counterclockwise from its neutral position, and port 168, as shown in Fig. 7, will contact vacuum port 160 of leaf 152 and, therefore, reduced air pressure will be applied through connection 172 to the bellows 176. At the same time, atmospheric pressure will enter port 170 from port 164 and will be applied through connection 174 to the bellows 178. Bellows 178 will therefore expand while bellows 176 will contract, and link 184 will pull on the end of rudder bar 186 to which it is attached while link 185 will push the other end of rudder bar 186 in a manner to rotate that member about pivot 188. Rudder valve link 190 will therefore be moved in the same direction as though pressure were applied to rudder pedal 194, and therefore, the trainer will turn to the right, i. e., in the direction of the assumed slower engine.

It will be appreciated that setting throttle 54 to a more closed position than throttle 56 will cause port 170 of leaf 166 to contact port 160 of leaf 152, while port 168 will be in communication with port 162. Vacuum will therefore enter tube 174 and bellows 178 while atmosphere will enter bellows 176 through line 172. The former bellows will contract, link 185 will pull the right end of rudder bar 186 toward the head of the trainer and at the same time, bellows 176 will expand, pushing link 184 and the left end of rudder bar 186 toward the rear of the trainer. Rudder valve link 190 will likewise move toward the rear and will affect the rudder valve in the same manner as though pressure were applied to rudder pedal 192. The trainer will therefore turn toward the left, again toward the side of the slower turning motor.

It will be realized therefore that my invention provides means for causing an assumed dual engine trainer to turn in the direction of the engine having the assumed slower motor speed.

Not only does a plane in flight turn toward the weaker engine, but at the same time the rudder pedals in the plane respond as though pressure were actually being applied to the rudder pedal on the side of the weaker engine.

It will be recalled that whenever vacuum enters bellows 176 and atmosphere enters bellows 178, the trainer is turned to the right through the action of links 184 and 185, rudder bar 186 and rudder valve link 190. Referring to Fig. 2, it will be seen that whenever this condition prevails, the right end of rudder bar 186 will move to the rear as will link 202 which last link will pull the bottom extension of rudder pedal 194 to which it is connected to the rear and rudder pedal 194 will move as though pressure were being applied thereto. At the same time, the left end of rudder bar 186 will move toward the front of the trainer as will link 200 and rudder pedal 192 will also move as though pressure were being applied to rudder pedal 194. It will be realized, therefore, that the foregoing means cause the rudder pedals in the trainer to respond to an unequal throttle setting in the same manner that the pedals in a real plane respond to the same circumstances.

In a real plane in flight, the turning caused by different engine speeds may be overcome by the pilot's applying pressure to the rudder pedal on the side of the stronger engine. Referring to Fig. 2, whenever throttle 54 is opened to a greater extent than throttle 56, atmosphere enters bellows 178 and vacuum enters bellows 176, link 195 and the right end of rudder bar 186 moves to the rear thereby moving rudder valve link 190 toward the front of the trainer, and the trainer will turn to the right, that is, in the direction of the weaker motor. The student in the trainer, by applying his foot to rudder pedal 192 will force link 200, the left end of rudder bar 186 and rudder valve link 190 to the rear, thus overcoming the turning of the trainer caused by the unequal throttle setting. The student must, as will be later shown, overcome a spring associated with the bellows 176 and 178 and, therefore, the pedal 192 feels the same to him as the "loaded" pedal in a plane in flight. Should throttle 56 be more open than throttle 54, atmosphere would enter bellows 176 and vacuum bellows 178. By applying his foot to pedal 194, the student could overcome the rudder pedal loading when pedal 194 is the "loaded" pedal.

Not only does a dual engine plane turn in the direction of the slower engine but the turning of the plane and the lesser lift upon the wing on the side of the slower engine causes the plane to bank in the direction of the slower engine. The following means are provided in my invention to simulate this aspect of actual flight.

Referring back to the situation that caused a collapsing of one of the bellows 176 or 178 and the expansion of the other, viz., an unequal setting of the throttles 54 and 56 and the resultant displacement of bar 70 from the horizontal position, it will be realized that whenever this situation prevails, vacuum port 171 is in communication with one of the ports 163 or 165, depending upon which throttle 54 or 56 is the farther open, and the other port 163 or 165 will communicate with the atmosphere through port 167 or 169. Therefore, the connection 187 will introduce vacuum or atmosphere into the aileron bellows 17 and the connection 189 will introduce atmosphere or vacuum into the other aileron bellows 16.

It will be understood that when throttle 54 is open farther than throttle 56, leaf 156 will be turned counterclockwise from its neutral position, as shown in Fig. 7, vacuum will enter right aileron bellows 17 from ports 171 and 163 and connection 187 while atmosphere will enter left aileron bellows 16 through ports 169 and 165 and connection 189. The left bellows will expand and the right bellows will contract, causing the trainer to bank to the right. Simultaneously, by means heretofore described, atmosphere expands bellows 176 and vacuum contracts bellows 178, and the trainer is turned to the right.

On the other hand, if throttle 54 be in a more closed position than throttle 56, the right end of bar 70 will be lower than the left end, leaf 166 will be turned clockwise from its neutral position as viewed from the rear of the trainer, and atmosphere will enter port 167, pass through port 163 of the center leaf and by means of fitting 177 and connection 187 to right banking bellows 17. At the same time, vacuum from port 171 will enter port 165 and by means of fitting 179 and connection 189 be introduced into the left banking bellows 16. The resultant expansion of the right bellows and collapsing of the left bellows will cause the trainer to bank to the left. From the preceding discussion it will be recalled that when throttle 54 is more closed than throttle 56 vacuum is introduced into bellows 178 and atmosphere into bellows 176, causing the trainer to turn to the left. Therefore, when throttle 54 is not open as far as throttle 56, the fuselage 10 is turned to the left and is also banked to the left, in simulation of the turning and banking to the left of a dual engine plane when its right engine is making more revolutions per minute than its left engine.

From the foregoing it will be seen that my invention provides means in a grounded aviation trainer for simulating the banking and turning of a plural engine aircraft resulting from a difference in the speeds of the engines in the plane.

Furthermore, the rudder pedals in the trainer will respond in the same manner that the rudder pedals in a plane in actual flight would respond and the student in the trainer may overcome the rudder loading just as though he were correcting the same condition in a flying airplane.

Whenever a plane in actual flight is turned, whether from an intentional turning by the pilot through rudder pedal movements or from a difference in engine speeds, not only does the plane automatically bank in the direction of the turn but its nose drops down and the plane loses altitude unless the pilot pulls back on the control column. The rudder valve 191 provided in trainers of the type under consideration have an auxiliary set of ports, as described in the copending application of Edwin A. Link and myself, Serial No. 457,692, now U. S. Patent 2,358,016, dated September 12, 1944, so that whenever the valve is positioned so as to rotate the trainer vacuum is automatically admitted to the front elevator bellows and atmosphere to the rear elevator bellows and the trainer automatically noses down. Therefore, whenever the trainer fuselage 10 is rotated in response to relative throttle settings two secondary responses of the fuselage occur, first, the fuselage banks in the direction of the turn, and second, the nose of the fuselage goes down.

The turning of a dual engine ship in actual flight caused by a difference in engine speeds is diminished as such a plane is banked in the opposite direction until, when a certain angle of bank is reached the turning and resulting banking so caused completely disappear. At the same time, the "rudder loading" which, as above described, accompanies the turning also disappears. Means will now be described for simulating in a trainer of the type under consideration this phenomenon of actual flight.

Referring to Figs. 2, 4, and 7, it has been mentioned that an extension 142 is affixed to leaf 130 by means of screws 140. As seen in Fig. 2, to the upper end of this extension is pivotally connected link 144, the other end of which is pivotally connected to the upper end of arm 242. Arm 242 pivots about the point at which the shaft 246 is rigidly affixed thereto. The other end of this shaft is rigidly affixed to arm 248 which also pivots about the point where shaft 246 connects thereto. Shaft 246 is pivotally mounted in bracket 250 affixed to platform 37.

To the upper end of lever 248 is pivotally connected the link 252 and the other end of link 252 is pivotally connected to the central support 15 of the trainer fuselage which is located below the universal joint 12. It will be appreciated therefore that whenever the trainer is banked laterally in either direction, link 252 will cause arm 248 to pivot in one direction or the other, the extent of such rotation depending upon the degree of the bank. This movement of lever 248 will cause shaft 246 to rotate in one direction or the other and the rotation of this shaft will cause the upper end of arm 242 to move toward one side of the trainer fuselage or the other and therefore link 144 will likewise reciprocate, moving extension 142 and causing leaf 130 to rotate upon hollow shaft 146. The rotation of leaf 130 will move vacuum-filled counterbore 134 out of perfect engagement with port 160 of leaf 152, and atmospheric ports 136 and 138 will be moved out of exact engagement with ports 162 and 164 respectively of leaf 152. Therefore, less vacuum will be applied to port 160 and less atmosphere will be applied to ports 162 and 164 and less vacuum and less atmosphere will be applied to the ports 168 and 170 if the throttles of the trainer be in such a position that the leaf 166 is moved from its neutral position. The turning of the trainer in response to the uneven throttle positions is therefore diminished. It is to be noticed, however, that this corrective banking of the trainer does not lessen the banking of the plane caused by uneven engine speeds, thereby simulating the case in actual flight where the wing on the side of the slower engine tends to fall because of the lesser lift upon that wing as a result of the slower engine speed. However, this wing may be raised by a movement of the control column in the plane toward the higher wing, and the same is true in the trainer as shown in the same aforementioned U. S. patents.

In illustration, let us assume that throttle 56 is opened to a greater extent than throttle 54, that is, it is moved farther to the left in Fig. 2 than throttle 54. Link 69 will be forced downwardly to a greater extent than link 68 and, therefore, port 170 of leaf 166 will communicate to an increased extent with port 160 of leaf 152 while port 168 of the former leaf will be placed in communication with port 162 of the latter leaf. Vacuum will be applied in greater magnitude through connection 174 to bellows 178 while atmosphere will be applied through connection 172 to bellows 176. The former bellows will contract and the latter will expand and rudder valve link 190 will be moved to the rear and the trainer will be made to turn to the left. Now assuming that the trainer be banked to the right, by means of link 252, arm 248, shaft 246, arm 242, link 144 and extension 142, leaf 130 will be made to rotate clockwise upon hollow shaft 146 and vacuum-filled counterbore 134 will become out of perfect engagement with port 160, less vacuum will be applied to port 160 of leaf 152 and, therefore, less vacuum will be applied to port 170 of leaf 166. Likewise, a reduction in the amount of vacuum applied to bellows 178 will result and air entering bleed hole 175 will cause that bellows to expand. At the same time, less atmosphere will be applied through port 136 or leaf 130 to port 162 in leaf 152 and, therefore, a reduction in the amount of atmosphere entering port 168 of leaf 166 will result. A similar reduction will be present in connection 172 and less atmosphere will enter bellows 176 which bellows therefore will be made to contract. The expansion of bellows 178 and the contraction of bellows 176 will offset the movement applied to rudder bar 186 as a result of the unequal throttle settings, and the rate of turning of the trainer will be decreased. The turning of the trainer to the left, caused by an opening of throttle 56 to a greater extent than throttle 54 will therefore be diminished by the banking of the trainer in the direction opposite to the turning. If the trainer were turning to the right as a result of throttle 54 being opened farther than throttle 56, a banking of the trainer to the left would likewise diminish the turning so caused.

It will be seen that the turning of the trainer as a result of simulated uneven engine speeds may be diminished by a banking of the trainer in either direction. Of course the student may counter this turning by applying pressure to the rudder pedal opposite the direction of the turning.

In addition to the banking of the plane and applying pressure to the opposite rudder, in planes of the type being simulated additional means are usually provided to overcome the turning caused by unequal engine speeds. These means are generally of two types, one means providing its compensation through positioning the rudder pedals and the other through positioning a tab on the rudder of the plane. Inasmuch as such compensating means in the trainer must be related to the rudder valve, the following means which have been incorporated in my invention in order that the student in the trainer may have at his disposal means for accomplishing the same result may be considered to be of either type.

Referring to Fig. 2, it will be seen that a winch comprising a worm 254 and a worm wheel 256 is provided. An arm 258 is rigidly affixed to the wheel 256 so that whenever this wheel be rotated through a turning of worm 254 the link 260 which is pivotally attached to the upper end of arm 258 is moved one way or the other depending upon the direction of rotation of the wheel 256. The other end of link 260 will move arm 262 which in turn will cause the chain sprocket 264 to which its lower end is rigidly attached to turn. The rotation of this sprocket will move chain 266 in one direction or the other and the tension upon the spring 268 will be increased or decreased and at the same time the tension upon spring 270 will be decreased or increased. Inasmuch as spring 268 is connected to link 272, the other end of which is connected to the upper end of rudder pedal 192 while the other end of spring 270 is connected to link 274 which has its other end connected to the upper part of rudder pedal 194, it will be realized that an increase in the tension upon spring 268 and the simultaneous decrease in the tension upon spring 270 will cause the rudder pedal to move in the same manner as though the student in the trainer were applying his left foot to left rudder pedal 268, while if the worm 256 be turned in such a direction that the tension upon spring 270 is increased and that upon spring 269 is decreased the rudder pedals will respond as though the student in the trainer were actually applying his right foot to rudder pedal 194. A suitable scale 276 and an index mark 278 on the wheel 256 are provided so that the student in the trainer, by referring to certain instruments (not shown) in the trainer may know where to position the wheel 256 to overcome the turning of the trainer caused by the unequal throttle settings.

My invention therefore provides means whereby the student in the trainer may overcome the turning of the trainer caused by assumed differences in engine speeds in addition to applying pressure to the rudder pedals and banking the trainer.

In the event that one of the bellows 176 or 178 be substantially contracted through the application of vacuum by means of connections 172 or 174, the natural response of the student in the trainer would be to apply his foot to the rudder pedal on the side of the contracted bellows. In order to overcome the atmospheric force being exerted on the outside of the contracted bellows, the student would be required to exert an inordinately large amount of force on the pedal. In order to overcome this difficulty the links 184 and 185 are in reality positive type spring compensator link rods. The detailed construction of these links is shown in Fig. 2A. The end 282 of this rod is connected to the movable part of the bellows 176 or 178 and the other end 284 is connected to rudder bar 186. Fixedly connected to part 284 is a housing 280. A slot 286 is present in each side of this housing and a horizontal stop 288 is attached to the end of link 282 as shown. This stop extends horizontally within housing 280 and the ends of this stop project through the slots 286 which are in both sides of the housing 280. A compression spring 290 is within housing 280, one end of this spring bearing against the interior right end of housing 280 and the other end bearing against the horizontal stop 288. Spring 290 has such a compression that whenever either of the bellows 176 or 178 is collapsed by an application of vacuum thereto, the stop 288 does not move substantially in slots 286 and therefore rudder bar 186 moves as though link rods 184 or 185 were solid, but in the event that either bellows 176 or 178 be contracted because of the reduced air pressure therewithin, if the student in the trainer applies his foot to the rudder pedal 192 or 194 on the side of the contracted bellows, the movement of rudder bar 186 will cause a contraction of spring 290 and consequently, rudder bar 186 will move even though the bellows in question continue to be contracted.

From the foregoing description it will be understood that my invention provides means for accomplishing the stated and other objects of the invention. Inasmuch as numerous changes in my preferred construction may be made without departing from the spirit of my invention, I limit myself only by the following claims.

I claim:

1. In an aeroplane trainer including a turnable and tiltable cockpit, and control means for turning and tilting the cockpit, the combination therewith of a pair of levers simulating the throttle control levers of a dual engine plane, and means operable by movement of one of the levers with respect to the other to actuate the control means to turn and tilt the cockpit.

2. In an aeroplane trainer including a turnable and tiltable cockpit, and control means for turning and tilting the cockpit, the combination therewith of a pair of bimotor control simulating throttle levers and means operable by movement of one of the levers with respect to the other to actuate the control means to turn and tilt the cockpit, and an indicator simulating the air speed indicator of a real plane, and additional means operable by movement of the throttle levers either jointly or independently to control the reading of said indicator.

3. In an aircraft pilot trainer, a pair of levers simulating motor control levers, a differential device operable thereby to be moved in response to relative movement of said levers, and turning and banking means operable by said differential device.

4. In an aircraft pilot trainer, a pair of levers simulating the throttle control levers of a dual engine plane, a differential device operable thereby to be moved in response to relative movement of said levers, turning and banking means, operable by said differential device, and independent control means for restoring the normal position of the banking and turning means independently of the relative position of said levers.

5. The combination of a grounded aviation trainer comprising a fuselage, means for rotating said fuselage in either direction about its vertical axis, means for banking said fuselage laterally in simulation of the banking of a plane in actual flight, a simulated vertical speed indicator in said fuselage, and means for actuating said indicator to indicate assumed vertical speeds, a plurality of simulated throttle control levers in said trainer, and means operated by said simulated throttle control levers for causing said rotating means to rotate said fuselage, said banking means to bank said fuselage and said actuating means to cause said indicator to register in accordance with the combined settings of said simulated throttle control levers.

6. The combination of a grounded aviation trainer comprising a fuselage, means for rotating said fuselage in either direction about its vertical axis, means for banking said fuselage laterally in simulation of the banking of a plane in actual flight, a simulated altimeter in said fuselage, and means for actuating said simulated altimeter to indicate assumed altitudes, a plurality of simulated throttle control levers in said trainer, and means operated by said simulated throttle control levers for causing said rotating means to rotate said fuselage, said banking means to bank said fuselage and said actuating means to cause said simulated altimeter to register in accordance with the combined settings of said simulated throttle control levers.

7. In a grounded aviation trainer the combination of a fuselage rotatably mounted upon a universal joint, means for laterally banking said fuselage in simulation of the banking of a plane in actual flight and means for rotating said fuselage about its vertical axis, a plurality of simulated throttle control levers within said fuselage, means for causing said rotating means to rotate said fuselage and said banking means to bank said fuselage according to the relative positions of said simulated throttle control levers, and additional means responsive to the lateral banking position of said fuselage for diminishing the rotation of said fuselage caused by the relative positions of said simulated throttle control levers whenever said fuselage is banked.

8. In a grounded aviation trainer the combination of a fuselage rotatably mounted upon a universal joint, means for laterally banking said fuselage in simulation of the banking of a plane in actual flight, means for rotating said fuselage about its vertical axis, a plurality of simulated throttle control levers within said fuselage, and a control element for controlling the rotation and banking of said fuselage, said control element being responsive to the combined positions of said simulated throttle control levers and the lateral banking position of said fuselage.

9. In an airplane trainer including a turnable cockpit, and control means for turning the cockpit, the combination therewith of a pair of levers simulating the throttle control levers of a dual engine plane, and means operable by movement of one of the levers with respect to the other to actuate the control means to turn the cockpit.

10. In an airplane trainer including a turnable cockpit, and control means for turning the cockpit, the combination therewith of a pair of levers simulating the throttle control levers of a dual engine plane, and means operable by movement of one of the levers with respect to the other to actuate the control means to turn the cockpit, an indicator simulating the air speed indicator of a real plane, and additional means operable by movement of the levers either jointly or independently to control the reading of said indicator.

11. In an airplane trainer, a pair of levers simulating the throttle control levers of a dual engine plane, a differential device operable thereby to be moved in response to relative movement of said levers and turning means operable by said differential device.

12. In an airplane trainer including a turnable cockpit and control means for turning the cockpit, the combination therewith of a pair of levers simulating the throttle control levers of a dual engine plane, means operable by movement of one of the levers with respect to the other to actuate the control means to turn the cockpit, and independent control means for restoring the normal position of the control means independently of the relative position of said levers.

13. In an airplane trainer including a turnable cockpit and control means for turning the cockpit, the combination therewith of a pair of levers simulating the throttle control levers of a dual engine plane, and means operable by movement of one of the levers with respect to the other to actuate the control means to turn the cockpit, a pair of simulated rudder pedals connected to said turning means for operating said turning means, and additional simulated trimming means connected to said turning means, for operating said turning means.

14. In an airplane trainer the combination of a pair of levers simulating the throttle control levers of a dual engine plane, a simulated air speed indicator, and means operable by movement of one of the levers with respect to the other to actuate said indicator.

15. In an airplane trainer including a turnable cockpit, and control means for turning the cockpit, the combination therewith of a pair of levers simulating multi-motor throttle control levers, and means operable by movement of one of the levers with respect to the other to actuate the control means to turn the cockpit.

16. In an aircraft pilot trainer including a turnable and tiltable cockpit, a pair of levers simulating the throttle control levers of a dual engine plane, means operable by movement of one of the levers with respect to the other to turn and tilt the cockpit, and independent control means for restoring the normal position of the banking and turning means independently of the relative position of said levers.

17. In an aircraft pilot trainer, a pair of levers simulating motor control levers, a device operable thereby to be moved in response to relative movement of said levers, turning means operable by said device, and independent control means for restoring the normal position of the turning means independently of the relative position of said levers.

18. In an aeroplane trainer including a turnable cockpit, and control means for turning the cockpit, the combination therewith of a pair of levers simulating the throttle levers of a dual engine plane, and means operable by movement of one of the levers with respect to the other to actuate the control means to turn the cockpit.

19. In an aeroplane trainer including a turnable cockpit, and control means for turning the cockpit, the combination therewith of a pair of levers simulating the throttle control levers of a dual engine plane, means operable by movement of one of the levers with respect to the other to actuate the control means to turn the cockpit, an indicator simulating the air speed indicator of a real plane, and additional means operable by movement of the throttle levers either jointly or independently to control the reading of said indicator.

20. An aircraft pilot trainer comprising a cockpit, mechanism operable to cause the cockpit to turn, a manual control in the cockpit for operating the said turn mechanism under control of the student, and additional means separate from said manual control for actuating said mechanism to cause the cockpit to turn in simulation of the action of a twin-motor aeroplane in which one motor is delivering less power than the other.

21. The combination of a grounded aviation trainer, a simulated air-speed indicator therein, means responsive to certain controls in said trainer for actuating said indicator to indicate assumed air speeds, a plurality of simulated throttle control levers in said trainer, and means operated by said simulated throttle control levers for causing the said actuating means to cause said indicator to register in accordance with the combined settings of said simulated throttle control levers.

22. In an aircraft pilot trainer, a pair of levers simulating motor control levers, a device operable thereby to be moved in response to relative movement of said levers, and turning and banking means operable by said device.

23. In an aircraft pilot trainer, a pair of levers simulating the throttle control levers of a dual engine plane, a device operable thereby to be moved in response to relative movement of said levers, turning and banking means operable by said device, and independent control means for restoring the normal position of the turning and banking means independently of the relative position of said levers.

24. An aircraft pilot trainer comprising a cockpit, mechanisms operable to cause the cockpit to turn and bank, manual controls in the cockpit for operating said turn and bank mechanisms respectively under control of the student, and additional means separate from said manual controls for actuating said mechanisms to cause the cockpit to turn and bank in simulation of the action of a multi-motored aeroplane in which one motor is delivering less power than the other.

25. The structure set forth in claim 14 in which a simulated vertical speed indicator is also provided and is operated by the means operable by movement of one of the levers with respect to the other.

26. The structure set forth in claim 14 in which a simulated altimeter is also provided and is operated by the means operable by movement of one of the levers with respect to the other.

KARL A. KAIL.